US008423956B2

(12) United States Patent
Banavar et al.

(10) Patent No.: US 8,423,956 B2
(45) Date of Patent: *Apr. 16, 2013

(54) SHARING RESOURCES AMONG HIERARCHICAL CONTAINERS OF RESOURCES

(75) Inventors: Guruduth Somasekhara Banavar, Pelham Manor, NY (US); Ramon Caceres, New York, NY (US); Sebastien Demathieu, Paris (FR); David Bruce Lection, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1143 days.

This patent is subject to a terminal disclaimer.

(21) Appl. No.: 12/114,842

(22) Filed: May 5, 2008

(65) Prior Publication Data

US 2008/0209432 A1    Aug. 28, 2008

Related U.S. Application Data

(63) Continuation of application No. 11/453,515, filed on Jun. 15, 2006, now Pat. No. 7,870,536.

(51) Int. Cl.
*G06F 9/44* (2006.01)
*G06F 9/45* (2006.01)

(52) U.S. Cl.
USPC ........... 717/120; 717/100; 717/101; 717/162; 717/163; 717/164; 717/167

(58) Field of Classification Search .................. None
See application file for complete search history.

(56) References Cited

U.S. PATENT DOCUMENTS 5,361,357 A    11/1994  Kionka
5,481,706 A *  1/1996  Peek ............................ 710/200
5,485,615 A    1/1996  Wennmyr
(Continued)

FOREIGN PATENT DOCUMENTS

WO        2004092978 A2    10/2004

OTHER PUBLICATIONS

Padmanabhan et al., "Multi-Dimensional Clustering: A New Data Layout Scheme in DB2"; ACM, SIGMOD 2003, Jun. 2003 San Diego, CA, pp. 637-641.

(Continued)

*Primary Examiner* — Emerson Puente
*Assistant Examiner* — Charles Swift
(74) *Attorney, Agent, or Firm* — Yee & Associates, P.C.; William Stock (57) ABSTRACT

Computer implemented method, system and computer usable program code for sharing resources among a plurality of containers in a data processing system. A computer implemented method includes creating a shared container for at least one resource to be shared. Then the at least one resource to be shared is moved from an original container of the at least one resource to the shared container, and a link is created between the original container and the at least one resource to be shared in the shared resource container. A link can also be created between a subject resource container and a shared resource in the shared resource container to enable the subject resource container to access and use the shared resource. A shared resource can also be removed from the shared resource container and returned to an original resource container when sharing of the resource is no longer desired.

20 Claims, 5 Drawing Sheets

U.S. PATENT DOCUMENTS

| | | | |
|---|---|---|---|
| 5,574,898 A | | 11/1996 | Leblang et al. |
| 5,854,932 A * | | 12/1998 | Mariani et al. ............... 717/116 |
| 6,195,659 B1 | | 2/2001 | Hyatt |
| 6,263,492 B1 * | | 7/2001 | Fraley et al. .................. 717/107 |
| 6,292,933 B1 | | 9/2001 | Bahrs et al. |
| 6,460,178 B1 * | | 10/2002 | Chan et al. .................... 717/147 |
| 6,546,395 B1 * | | 4/2003 | DeKimpe et al. ..................... 1/1 |
| 6,665,678 B2 | | 12/2003 | Ching Chen et al. |
| 6,678,716 B1 | | 1/2004 | Pronsati, Jr. et al. |
| 6,678,889 B1 * | | 1/2004 | Burkett et al. ................ 718/104 |
| 6,708,330 B1 * | | 3/2004 | Moberg et al. ................ 717/158 |
| 6,782,508 B1 | | 8/2004 | Bahrs et al. |
| 6,789,251 B1 | | 9/2004 | Johnson |
| 6,804,682 B1 * | | 10/2004 | Kemper et al. ....................... 1/1 |
| 6,804,686 B1 * | | 10/2004 | Stone et al. ......................... 1/1 |
| 6,938,240 B2 | | 8/2005 | Charisius et al. |
| 6,950,990 B2 | | 9/2005 | Rajarajan et al. |
| 6,966,061 B1 | | 11/2005 | Vance et al. |
| 7,051,036 B2 | | 5/2006 | Rosnow et al. |
| 7,055,130 B2 | | 5/2006 | Charisius et al. |
| 7,080,081 B2 | | 7/2006 | Agarwal et al. |
| 7,127,707 B1 * | | 10/2006 | Mishra et al. ................. 717/137 |
| 7,152,224 B1 * | | 12/2006 | Kaler et al. ................... 717/121 |
| 7,210,124 B2 * | | 4/2007 | Chan ............................. 717/120 |
| 7,236,974 B2 | | 6/2007 | Bhattacharjee et al. |
| 7,251,655 B2 | | 7/2007 | Kaler et al. |
| 7,272,818 B2 | | 9/2007 | Ishimitsu et al. |
| 7,328,206 B2 | | 2/2008 | Petculescu et al. |
| 7,370,315 B1 * | | 5/2008 | Lovell et al. ................. 717/100 |
| 7,383,320 B1 * | | 6/2008 | Silberstein et al. ........... 709/219 |
| 7,461,049 B2 * | | 12/2008 | Thompson et al. ................... 1/1 |
| 7,487,436 B2 | | 2/2009 | Aureglia et al. |
| 7,490,319 B2 | | 2/2009 | Blackwell et al. |
| 7,631,014 B2 | | 12/2009 | Bhattacharjee et al. |
| 7,707,566 B2 * | | 4/2010 | Grover et al. ................ 717/148 |
| 7,765,211 B2 | | 7/2010 | Bhattacharjee et al. |
| 7,797,293 B2 | | 9/2010 | Pabla et al. |
| 7,844,570 B2 | | 11/2010 | Netz et al. |
| 7,870,536 B2 * | | 1/2011 | Banavar et al. .............. 717/100 |
| 7,971,198 B2 * | | 6/2011 | Almeida ........................ 717/164 |
| 8,005,872 B2 | | 8/2011 | Bhattacharjee et al. |
| 8,037,056 B2 | | 10/2011 | Naicken et al. |
| 8,069,437 B2 * | | 11/2011 | Aigner et al. ................ 717/109 |
| 8,219,991 B2 | | 7/2012 | Soroker et al. |
| 2002/0087561 A1 | | 7/2002 | Ching Chen et al. |
| 2002/0097253 A1 | | 7/2002 | Charisius et al. |
| 2003/0195898 A1 | | 10/2003 | Agarwal et al. |
| 2004/0031015 A1 * | | 2/2004 | Ben-Romdhane et al. ... 717/107 |
| 2004/0060036 A1 * | | 3/2004 | Natori et al. .................. 717/100 |
| 2004/0205066 A1 | | 10/2004 | Bhattacharjee et al. |
| 2004/0216090 A1 * | | 10/2004 | Kaler et al. ................... 717/121 |
| 2004/0220972 A1 | | 11/2004 | Bhattacharjee et al. |
| 2004/0226031 A1 * | | 11/2004 | Zimmerman et al. ......... 719/331 |
| 2005/0005261 A1 * | | 1/2005 | Severin .......................... 717/108 |
| 2005/0034098 A1 * | | 2/2005 | DeSchryver et al. ......... 717/101 |
| 2005/0166094 A1 * | | 7/2005 | Blackwell et al. .............. 714/38 |
| 2005/0278709 A1 * | | 12/2005 | Sridhar et al. ................ 717/136 |
| 2006/0020619 A1 | | 1/2006 | Netz et al. |
| 2006/0190503 A1 | | 8/2006 | Naicken et al. |
| 2006/0206496 A1 | | 9/2006 | Aureglia et al. |
| 2006/0218538 A1 * | | 9/2006 | van Kesteren ................ 717/137 |
| 2006/0238800 A1 * | | 10/2006 | Czudak et al. ............... 358/1.15 |
| 2006/0282837 A1 * | | 12/2006 | Almeida ........................ 718/104 |
| 2007/0094607 A1 * | | 4/2007 | Morgan et al. ................ 715/762 |
| 2007/0255772 A1 | | 11/2007 | Bhattacharjee et al. |
| 2007/0283328 A1 * | | 12/2007 | Javed et al. ................... 717/127 |
| 2007/0288883 A1 | | 12/2007 | Soroker et al. |
| 2007/0294667 A1 * | | 12/2007 | Caceres et al. ................ 717/120 |
| 2008/0263511 A1 * | | 10/2008 | Shapiro ......................... 717/104 |

OTHER PUBLICATIONS

Randell et al., "Visual Studio 2005: Bridge the Gap Between Development and Operations with Whitehorse", msdn magazine, pp. 1-9, retrieved Apr. 19, 2006. http://msdn.microsoft.com/msdnmag/issies/04/07/Whitehorse.

Williams, "An Overview of Microsoft's Whitehorse", Mar. 23, 2-4, retrieved Apr. 19, 2006, http://www.developer.com/net/cplus/print/php/3329641.

"Rational Application Developer for WebSphere Software—Comprehensive Eclipse-based rapid application development for software developers", IBM, pp. 1-2, retrieved Apr. 19, 2006, http://www.ibm.com/software/awktools/developer/application.

Eclipse website, retrieved Apr. 19, 2006, http://www.eclipse.com.

Beck, "D44 Table Partitioning Fundamentals", IBM Corporation 2005, DB2 Information Management Technical Conference, Orlando Florida, Sep. 2005, pp. 1-43.

USPTO Notice of allowance for U.S. Appl. No. 12/125,717 dated Apr. 15, 2011.

USPTO office action for U.S. Appl. No. 11/453,492 dated Jun. 15, 2010.

USPTO Notice of allowance for U.S. Appl. No. 11/453,515 dated Sep. 1, 2010.

USPTO office action for U.S. Appl. No. 12/125,717 dated Sep. 9, 2010.

Chen et al., "Distributed Dynamic Scheduling of Composite Tasks on Grid Computing Systems", 2002 IEEE, pp. 88-97.

Gensel et al., "Integrating Constraints, Composite Objects and Tasks in a Knowledge Representation System", 1993, IEEE, pp. 127-130.

USPTO Notice of allowance for U.S. Appl. No. 11/450,618 dated Oct. 27, 2009.

USPTO final office action dated Nov. 9, 2010 regarding U.S. Appl. No. 11/453,492, 16 Pages.

USPTO final office action dated Jul. 26, 2011 regarding U.S. Appl. No. 11/453,492, 18 Pages.

USPTO non-final office action dated Feb. 17, 2011 regarding U.S. Appl. No. 11/453,492, 13 Pages.

Preliminary Amendment filed Mar. 27, 2008 regarding U.S. Appl. No. 11/453,515, 4 Pages.

USPTO final office action dated Feb. 23, 2009 regarding U.S. Appl. No. 11/412,554, 9 Pages.

USPTO non-final office action dated Aug. 5, 2008 regarding U.S. Appl. No. 11/412,554, 10 Pages.

USPTO notice of allowance dated Jul. 29, 2009 regarding U.S. Appl. No. 11/412,554, 8 Pages.

USPTO non-final office action dated Nov. 25, 2011 regarding U.S. Appl. No. 12/115,661, 28 Pages.

USPTO non-final office action dated Mar. 6, 2012 regarding U.S. Appl. No. 11/453,492, 20 Pages.

USPTO notice of allowance dated Mar. 2, 2012 regarding U.S. Appl. No. 12/115,661, 15 Pages.

Notice of Allowance dated Jun. 19, 2012 regarding USPTO U.S. Appl. No. 11/453,492, 9 pages.

\* cited by examiner

SHARING RESOURCES AMONG HIERARCHICAL CONTAINERS OF RESOURCES

This application is a continuation of application Ser. No. 11/453,515, filed Jun. 15, 2006, now U.S. Pat. No. 7,870,536.

BACKGROUND OF THE INVENTION

1. Field of the Invention

The present invention relates generally to the data processing field and, more particularly, to a computer implemented method, system and computer usable program code for sharing resources among a plurality of hierarchically arranged containers of resources in a data processing system.

2. Description of the Related Art

Many Integrated Development Environments (IDEs) such as Eclipse, JBuilder® and Virtual Studio®, help software developers manage the source code of their applications using an artifact referred to as a "project." A project defines a compilation unit in which source files are stored and can be built to produce an executable program.

In the case of multi-tiered applications, the source code is usually distributed among several projects, with each project being dedicated to a specific tier. A typical example is a client-server application, where one project is used to implement client components and another project is used to implement server components. Each tier is part of the same system and it frequently occurs that one or more components, a messaging API (Application Program Interface) for example, need to be replicated and used in several tiers of the application. Consequently, the source files of these components have to be shared among several projects.

Several approaches are currently available for managing source files that are shared among a plurality of projects. One approach is to give the developer the responsibility of maintaining multiple copies of the files in different projects. This approach, however, requires substantial effort from the developer who has to manually handle the file creations/deletions and keep the copies in sync.

Another approach is to declare a reference to an external project, and include the content of the referenced project in the local compiler path. This is the standard mechanism for sharing components among several projects using the features provided by an IDE. This approach, however, has several drawbacks including the following:

Coarse granularity: Only complete projects can be shared. The developer cannot share finer grain components.

Hidden sharing: The sharing operation is hidden behind obscure properties so that the developer has no visibility on the shared components.

It would, accordingly, be desirable to provide an improved mechanism for sharing resources among a plurality of containers of resources in a data processing system.

SUMMARY OF THE INVENTION

Exemplary embodiments provide a computer implemented method, system and computer usable program code for sharing resources among a plurality of containers of resources in a data processing system. A computer implemented method for sharing resources among a plurality of containers of resources in a data processing system includes creating a shared container for at least one resource to be shared. Then the at least one resource to be shared is moved from an original container of the at least one resource to the shared container, and a link is created between the original container and the at least one resource to be shared in the shared resource container. A link can also be created from a subject resource container to a shared resource in the shared resource container to enable the subject resource container to access and use the shared resource. A shared resource can also be removed from the shared resource container and returned to an original resource container when sharing of the resource is no longer desired.

BRIEF DESCRIPTION OF THE DRAWINGS

The novel features believed characteristic of the exemplary embodiments are set forth in the appended claims. The exemplary embodiments themselves, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
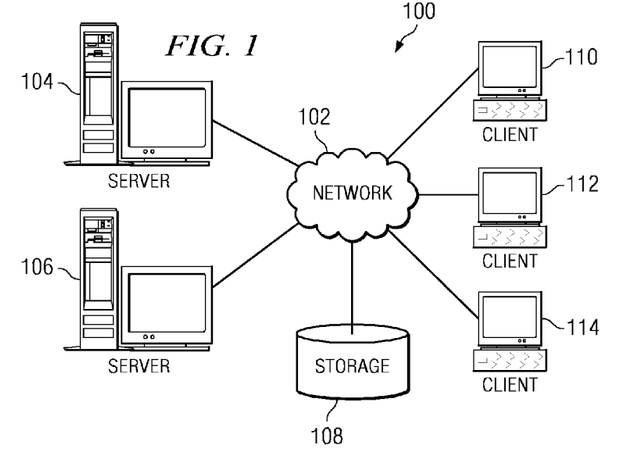
FIG. 1 depicts a pictorial representation of a network of data processing systems in which exemplary embodiments may be implemented.
Figure 2:
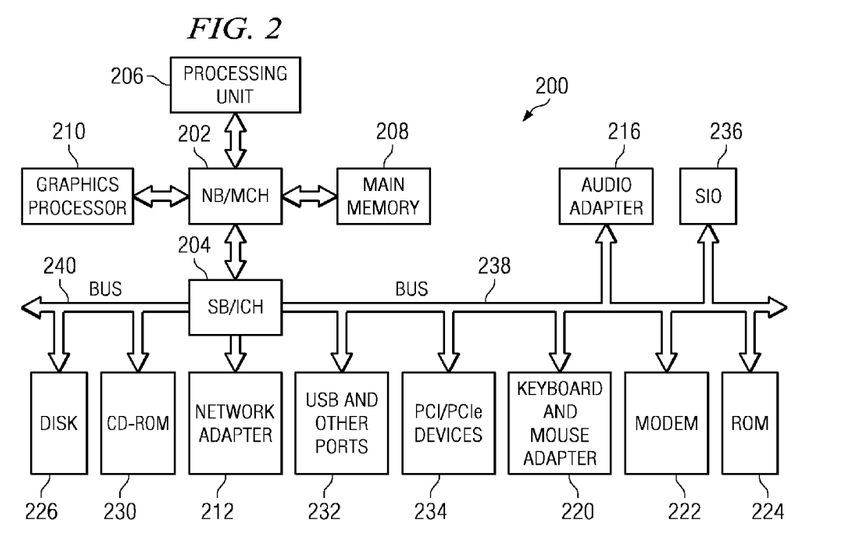
FIG. 2 is a block diagram of a data processing system in which exemplary embodiments may be implemented.

With reference now to the figures and in particular with reference to FIGS. 1-2, exemplary diagrams of data processing environments are provided in which exemplary embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which exemplary embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which exemplary embodiments may be implemented. Data processing system 200 is an example of a computer, such as server 104 or client 110 in FIG. 1, in which computer usable code or instructions implementing the processes may be located for the exemplary embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide a computer implemented method, system and computer usable program code for sharing resources among a plurality of hierarchically arranged containers of resources in a data processing system.

Figure 3:
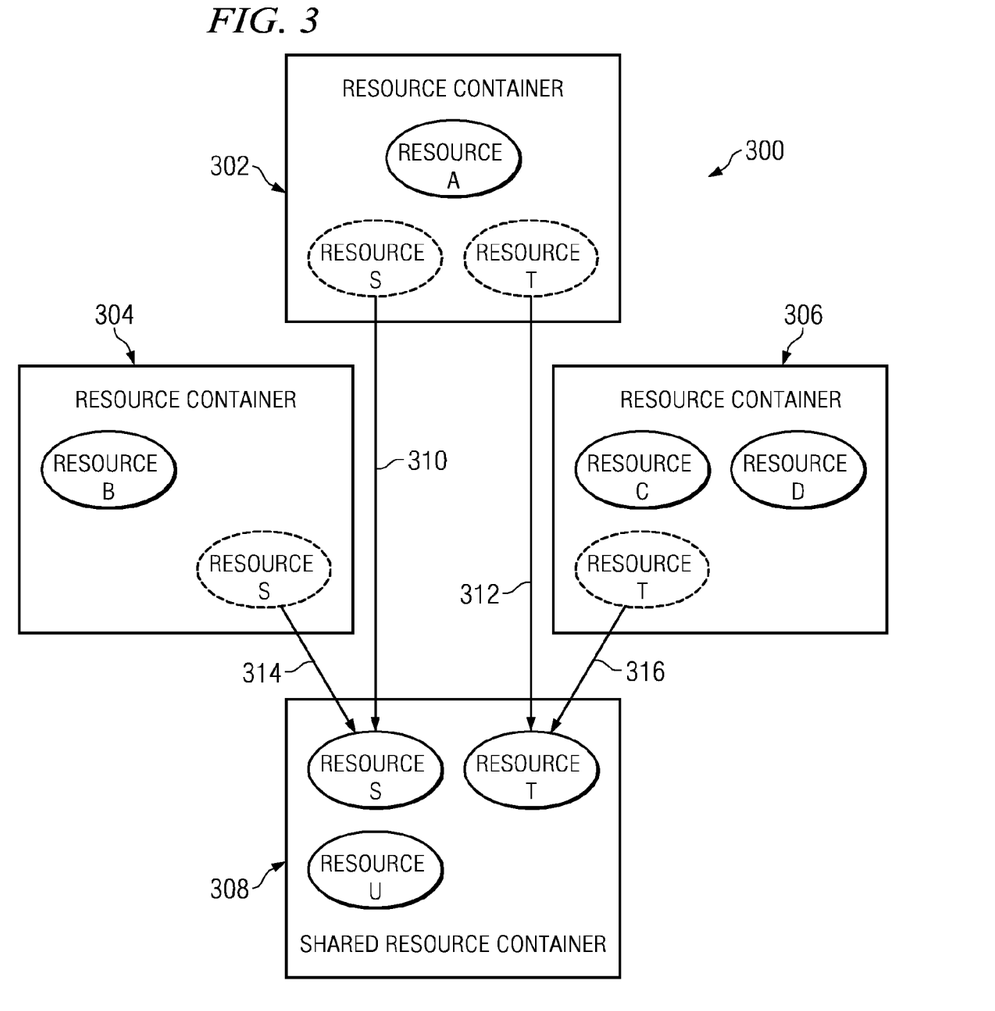
FIG. 3 is a block diagram that schematically illustrates a system for sharing resources among hierarchical containers of resources according to an exemplary embodiment.

FIG. 3 is a block diagram that schematically illustrates a system for sharing resources among hierarchical containers of resources according to an exemplary embodiment. The system is generally designated by reference number 300, and comprises a plurality of resource containers 302, 304 and 306 containing resources. As shown in FIG. 3, resource container 302 contains resource A, resource container 304 contains resource B, and resource container 306 contains resources C and D. This is intended to be exemplary only as system 300 can contain any number of resource containers, and each resource container can contain any number of resources.

A resource can, for example, be a folder or file that contains source code. A container can, for example, be a project that contains folders and files, i.e. that contains resources. A container can also be a composite project that contains other projects, including other composite projects.

System 300 also includes shared resource container 308. Shared resource container 308 contains resources S, T and U that have been moved from their original containers to shared resource container 308 so that the resources may be shared among resource containers 302, 304 and 306 in system 300. In particular, by moving resources S, T and U to shared resource container 308, they can be linked to and accessed by one or more of resource containers 302, 304 and 306. Thus, in the exemplary embodiment illustrated in FIG. 3, resource container 302 has been linked to and can access and use resources S and T via links 310 and 312, respectively, resource container 304 has been linked to and can access and use resource S via link 314, and resource container 306 has been linked to and can access and use resource T via link 316. Resources A, B, C and D, on the other hand, are unshared resources and cannot be accessed by other than the resource containers in which they are contained.

Figure 4:
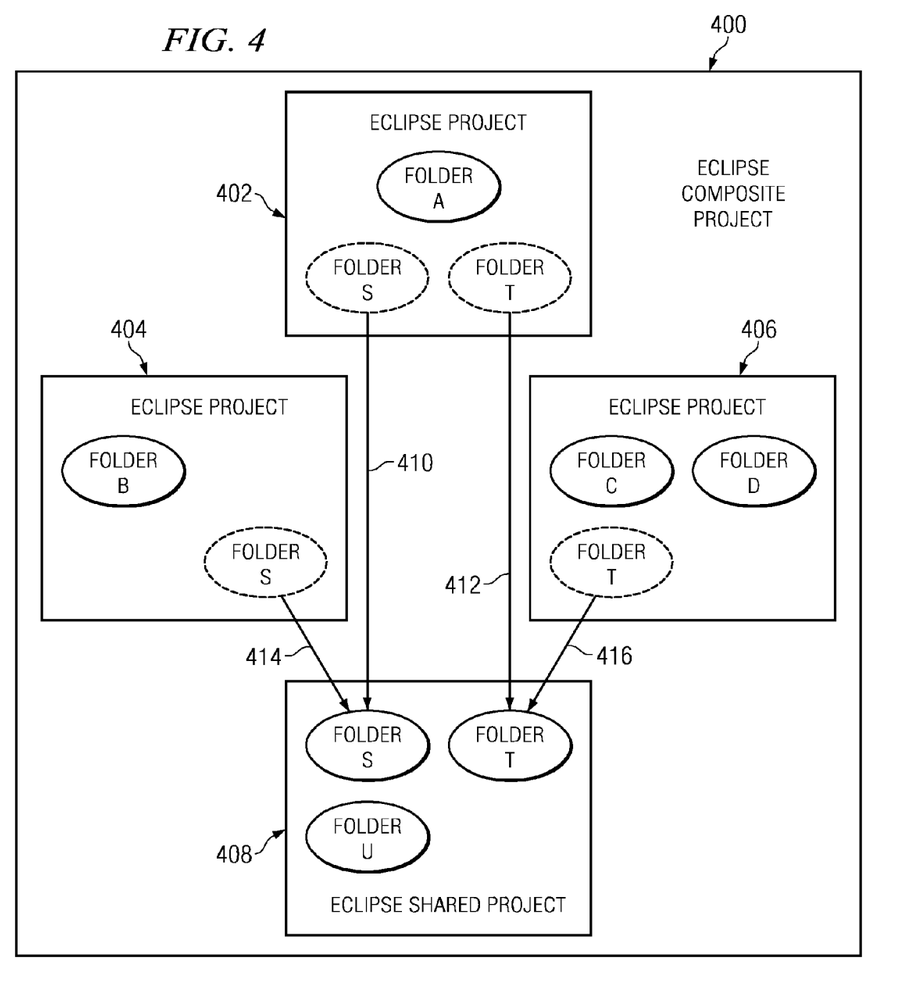
FIG. 4 is a block diagram that schematically illustrates a system for sharing resources among hierarchical projects in an Eclipse integrated development environment according to an exemplary embodiment.

FIG. 4 is a block diagram that schematically illustrates a system for sharing resources among hierarchical projects in an Eclipse integrated development environment according to an exemplary embodiment. In particular, FIG. 4 is an exemplary implementation of system 300 illustrated in FIG. 3, and utilizes corresponding reference numbers to refer to corresponding components.

As shown in FIG. 4, Eclipse composite project 400 includes Eclipse projects 402, 404 and 406; and Eclipse shared project 408. Eclipse project 402 contains folder A and is linked to and can access and use folders S and T in Eclipse shared project 408 via links 410 and 412, respectively. Eclipse project 404 contains folder B and is linked to and can access and use folder S in Eclipse shared project 408 via link 414. Eclipse project 406 contains folders C and D and is linked to and can access and use folder T in Eclipse shared project 408 via link 416.

Figure 5:
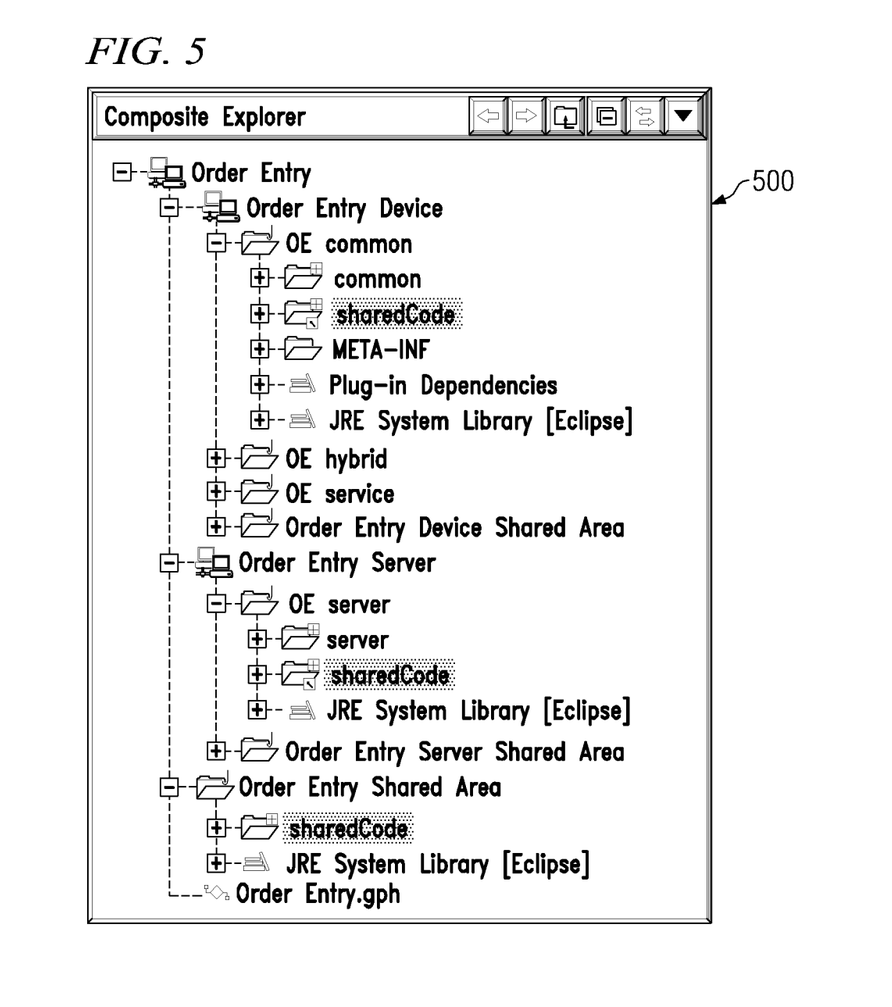
FIG. 5 illustrates a project structure for an Order Entry example software application in the system of FIG. 4 according to an exemplary embodiment.

FIG. 5 illustrates a project structure 500 for an Order Entry example software application in the system of FIG. 4 according to an exemplary embodiment.

According to exemplary embodiments, three operations for managing shared resources (e.g., source files) among a plurality of containers of resources (e.g., projects) are provided. These include a "share resource" operation, an "use shared resource" operation and an "unshare resource" operation.

Figure 6:
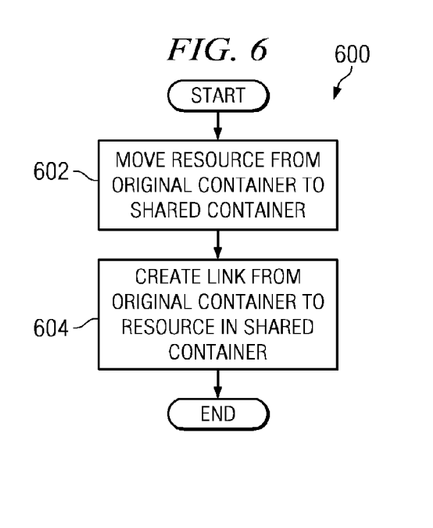
FIG. 6 is a flowchart that illustrates a method for a "share resource" operation according to an exemplary embodiment.

FIG. 6 is a flowchart that illustrates a method for a "share resource" operation according to an exemplary embodiment. The method is generally designated by reference number 600, and begins by moving a resource to be shared from an original resource container in which the resource is located to a shared resource container (Step 602). A link is then created from the original resource container to the shared resource in the shared resource container (Step 604), and the method ends.

Figure 7:
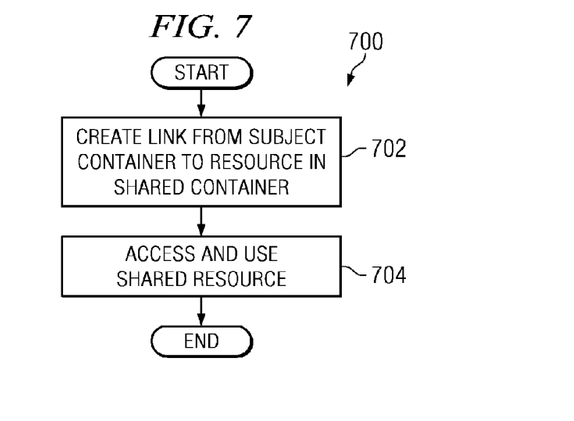
FIG. 7 is a flowchart that illustrates a method for an "use shared resource" operation according to an exemplary embodiment.

FIG. 7 is a flowchart that illustrates a method for an "use shared resource" operation according to an exemplary embodiment. The method is generally designated by reference number 700, and begins by creating a link from a subject resource container that wishes to access and use a shared resource to the resource in the shared resource container (Step 702). The shared resource is then accessed and used as needed by the subject resource container (Step 704), and the method ends.

Figure 8:
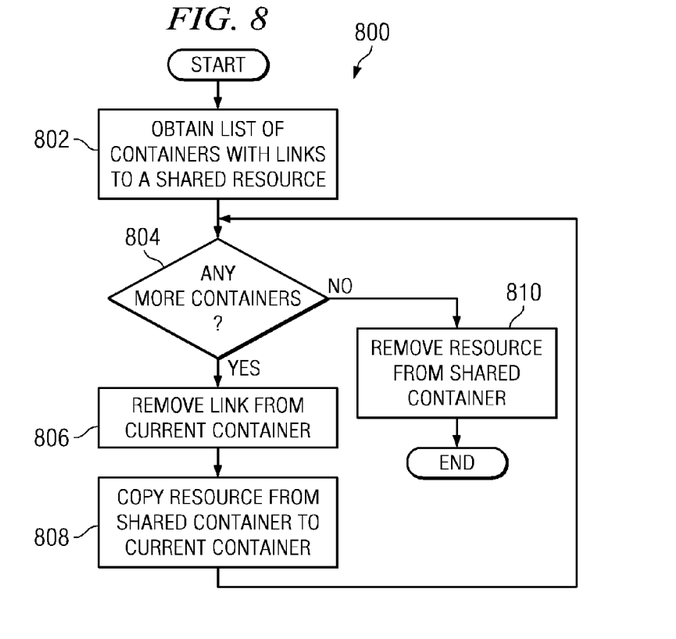
FIG. 8 is a flowchart that illustrates a method for an "unshare resource" operation according to an exemplary embodiment.

FIG. 8 is a flowchart that illustrates a method for an "unshare resource" operation according to an exemplary embodiment. The method is generally designated by reference number 800, and begins by obtaining a list of resource containers having links to a shared resource to be "unshared" (Step 802). A determination is made whether there are any more resource containers on the list with links to the shared resource (Step 804). If there is a resource container with a link to the shared resource (Yes output of Step 804), the link is removed from that container, i.e., the current container, (Step 806), and the shared resource is copied from the shared resource container to the current container (Step 808). The method then returns to Step 804 to determine if there are any more resource containers with links to the shared container. If there are no more resource containers with links to the shared container (No output of Step 804), the resource is removed from the shared resource container (Step 810), and the method ends.

Exemplary embodiments rely on a multi-tiered project structure, where all projects of a given application are referenced by metadata. When a multi-tiered project is created, the metadata is initialized and a project dedicated to the management of the shared components is created as well. The shared components of the application will be stored in this project, which is accessible and editable at any time by the developer.

Consider an application implemented as three projects: project D, project S and the shared components project. Project D defines a component C that the developer wants to reuse in project S. The "share component" operation is implemented by moving component C from its original location (D) to the shared components project, and then creating a symbolic link to C in project D. The "use shared component" operation is implemented by creating a symbolic link in project S pointing to the shared component C. Both operations are performed using information stored in the metadata of the project (such as the location of the shared component project). Consequently, a project needs to be known as part of the system (and referenced in the metadata) in order for the project to use the sharing features.

A history of the sharing operations in a given application is stored in the metadata. Accessing this history allows system tooling to undo/redo these operations, which supports the "unshare component" feature.

The following scenario illustrates a typical use of the three operations in a method for managing resources in a data processing system:

A developer implements a messaging API in a project that holds the client code of its application. The developer wants to leverage this API to implement the server components of the application that will handle the client requests.

The developer enables the sharing of the "messaging API" resources.

The developer accesses the list of resources available for sharing, and then selects the messaging API resources to be used in the server project. Although this resource was first defined in the client project, it is now used in both the client and the server projects.

The exemplary embodiments provide for sharing of resources at a fine grain. A developer is able to select precisely the resources that he/she wants to share inside a project. These resources will then be accessible from other projects.

When the sharing features are enabled, the developer is able to work in different projects with multiple links to the same resource. The resource is visible as a first-class object in each project, and it is possible to access and edit the resource using standard tooling, the same as if it were a regular resource. Changes to a shared resource from any container are immediately visible to all other containers that link to that resource.

These sharing features facilitate development of applications intended to run on multiple computing platforms, such as different mobile devices. Since each shared object appears as a first-class resource in each project that uses the object, the compilation of a shared resource can be customized to the particular platform to which each project is targeted. For example, the same shared resource can be compiled against Java™ 2 Standard Edition (J2SE) libraries when compiled as part of a project targeted to one class of mobile device, and compiled against Java™ 2 Micro Edition (J2ME) libraries when compiled as part of another project targeted to a different class of mobile device.

As indicated above, support is also provided for unsharing previously shared resources. As sharing a resource changes the state of the source and target projects, it is necessary to rollback these modifications if the developer wants to cancel a sharing operation. Using the "unshare resource" operation, the projects can be restored to their initial state.

Exemplary embodiments thus provide a computer implemented method, system and computer usable program code for sharing resources among a plurality of containers of resources in a data processing system. A computer implemented method for sharing resources among a plurality of containers of resources in a data processing system includes creating a shared container for at least one resource to be shared. Then the at least one resource to be shared is moved from an original container of the at least one resource to the shared container, and a link is created between the original container and the at least one resource to be shared in the shared resource container. A link can also be created from a subject resource container to a shared resource in the shared resource container to enable the subject resource container to access and use the shared resource. A shared resource can also be removed from the shared resource container and returned to an original resource container when sharing of the resource is no longer desired.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sharing a resource among a plurality of resource containers in a data processing system, the computer implemented method comprising:
    creating a shared resource container for at least one resource to be shared, responsive to receiving a request identifying the at least one resource to be shared;
    identifying the at least one resource to be shared from an original resource container, wherein the original resource container is unshared;
    moving each at least one resource to be shared from a respective original resource container to the shared resource container;
    creating a direct link between each respective original resource container and a corresponding each at least one resource to be shared in the shared resource container;
    obtaining a list of the original resource containers having the direct link to the corresponding at least one shared resource in the shared resource container, responsive to receiving a request identifying the at least one shared resource to be unshared;
    responsive to a determination there are more original resource containers in the list with links to the at least one shared resource, removing a link to the at least one shared resource from each respective original resource container;
    copying the at least one shared resource from the shared resource container to the each respective original container; and
    responsive to a determination there are no more original resource containers in the list with links to the at least one shared resource removing the at least one shared resource to be unshared from the shared resource container.

2. The computer implemented method according to claim 1, and further comprising:
    creating the direct link between a subject resource container and a target shared resource of the at least one resource to be shared in the shared resource container to enable the subject resource container to access the target shared resource in the shared resource container.

3. The computer implemented method according to claim 2, and further comprising:
    the subject resource container accessing and using the target shared resource in the shared resource container, using the direct link.

4. The computer implemented method according to claim 2, and further comprising:
    unsharing a resource to be shared in the shared resource container.

5. The computer implemented method according to claim 4, wherein unsharing a resource to be shared in the shared resource container comprises:
    identifying at least one shared resource to be unshared from the shared resource container;

removing the direct link between the subject resource container and the identified at least one shared resource to be unshared in the shared resource container;

copying the identified at least one shared resource to be unshared from the shared resource container to the subject resource container; and removing the identified at least one shared resource to be unshared from the shared resource container.

6. The computer implemented method according to claim 1, wherein the plurality of resource containers comprises a plurality of projects, and wherein the at least one shared resource comprises at least one file or folder.

7. The computer implemented method according to claim 6, wherein the at least one file or folder contains source code of an application.

8. The computer implemented method according to claim 1, wherein at least one of the plurality of resource containers comprises a composite project that contains other projects.

9. The computer implemented method according to claim 2, and further comprising:

customizing processing of the target shared resource for the subject resource container, programmatically in accordance with the respective subject resource container, such that the target shared resource is processed differently for the subject resource container than for other resource containers of a plurality of subject resource containers that are directly linked to the target shared resource.

10. The computer implemented method according to claim 9, wherein the target shared resource comprises a shared source code and wherein the plurality of subject resource containers comprise a plurality of programming projects, and wherein customizing processing of the target shared resource for the subject resource container, comprises:

customizing compilation and linking of the shared source code differently for each of a plurality of computing platforms in which each programming project that links to the shared source code is intended to run, programmatically in accordance with the respective subject resource container.

11. A computer program product for sharing a resource among a plurality of resource containers, the computer program product comprising:

one or more computer-readable tangible storage devices:

program instructions stored on the one or more computer-readable tangible storage devices, the program instructions comprising;

program instructions for creating a shared resource container for at least one resource to be shared, responsive to receiving a request identifying the at least one resource to be shared;

program instructions for identifying the at least one resource to be shared from an original resource container, wherein the original resource container is unshared;

program instructions for moving each at least one resource to be shared from a respective original resource container to the shared resource container;

program instructions for creating a direct link between each respective original resource container and a corresponding each at least one resource to be shared in the shared resource container;

program instructions for obtaining a list of the original resource containers having the direct link to the corresponding at least one shared resource in the shared resource container, responsive to receiving a request identifying the at least one shared resource to be unshared;

program instructions responsive to a determination there are more original resource containers in the list with links to the at least one shared resource, for removing a link to the at least one shared resource from each respective original resource container;

program instructions for copying the at least one shared resource from the shared resource container to the each respective original container; and program instructions responsive to a determination there are no more original resource containers in the list with links to the at least one shared resource, for removing the at least one shared resource to be unshared from the shared resource container.

12. The computer program product according to claim 11, and further comprising:

program instructions for creating the direct link between a subject resource container and a target shared resource of the at least one resource to be shared in the shared resource container to enable the subject resource container to access the target shared resource in the shared resource container, using the direct link.

13. The computer program product according to claim 12, and further comprising:

program instructions for unsharing a resource to be shared in the shared resource container.

14. The computer program product according to claim 13, wherein the program instructions for unsharing a resource to be shared in the shared resource container comprises:

program instructions for identifying at least one shared resource to be unshared from the shared resource container;

program instructions for removing the direct link between the subject resource container and the identified at least one shared resource to be unshared in the shared resource container;

program instructions for copying the identified at least one shared resource to be unshared from the shared resource container to the subject resource container; and program instructions for removing the identified at least one shared resource to be unshared from the shared resource container.

15. A system for sharing a resource among a plurality of resource containers in a data processing system, comprising:

one or more processors, one or more computer readable memories, and one or more computer-readable tangible storage devices;

program instructions, stored in the one or more computer-readable tangible storage devices for execution by the one or more processors, using the one or more computer readable memories, and the one or more computer-readable tangible storage devices to direct the system to:

create a shared resource container for at least one resource to be shared, responsive to receiving a request identifying the at least one resource to be shared;

identify the at least one resource to be shared from an original resource container, wherein the original resource container is unshared;

move each at least one resource to be shared from a respective original resource container to the shared resource container;

create a direct link between each respective original resource container and a corresponding each at least one resource to be shared in the shared resource container;

obtain a list of the original resource containers having the direct link to the corresponding at least one shared resource in the shared resource container, responsive to receiving a request identifying the at least one shared resource to be unshared;

responsive to a determination there are more original resource containers in the list with links to the at least one shared resource, remove a link to the at least one shared resource from each respective original resource container;

copy the at least one shared resource from the shared resource container to the each respective original container; and responsive to a determination there are no more original resource containers in the list with links to the at least one shared resource, remove the at least one shared resource to be unshared from the shared resource container.

16. The system according to claim 15, and wherein program instructions, stored in the one or more computer-readable tangible storage devices for execution by the one or more processors, using the one or more computer readable memories, and the one or more computer-readable tangible storage devices further directs the system to:

create the direct link between a subject resource container and a target shared resource of the at least one resource to be shared in the shared resource container to enable the subject resource container to access the target shared resource in the shared resource container, using the link.

17. The system according to claim 16, and wherein program instructions, stored in the one or more computer-readable tangible storage devices for execution by the one or more processors, using the one or more computer readable memories, and the one or more computer-readable tangible storage devices further directs the system to:

unshare a resource to be shared in the shared resource container.

18. The system according to claim 17, wherein the comprises program instructions, stored in the one or more computer-readable tangible storage devices for execution by the one or more processors, using the one or more computer readable memories, and the one or more computer-readable tangible storage devices further directs the system to:

identify at least one shared resource to be unshared from the shared resource container;

remove the direct link between the subject resource container and the identified at least one shared resource to be unshared in the shared resource container;

copy the identified at least one shared resource to be unshared from the shared resource container to the subject resource container; and remove the identified at least one shared resource to be unshared from the shared resource container.

19. The system according to claim 15, wherein the plurality of resource containers comprises a plurality of projects arranged in a hierarchy, and wherein the at least one shared resource comprises at least one file or folder.

20. The system according to claim 15, wherein at least one of the plurality of resource containers comprises a composite project that contains other projects.

* * * * *